Figure 1:
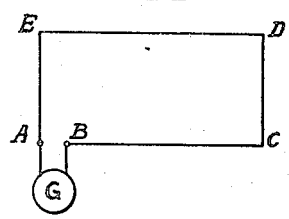

July 24, 1928.

K. SUNDBERG 1,678,489

METHOD AND DEVICE FOR DETECTING AND LOCATING ORES IN AN ELECTROMAGNETIC WAY

Filed Feb. 5, 1925

INVENTOR
Karl Sundberg
BY
Pennie Davis Marvin & Edmonds
ATTORNEYS

Patented July 24, 1928.

1,678,489

UNITED STATES PATENT OFFICE.

KARL SUNDBERG, OF RASUNDA, SWEDEN, ASSIGNOR TO AKTIEBOLAGET ELEKTRISK MALMLETNING, OF STOCKHOLM, SWEDEN, A JOINT-STOCK COMPANY.

METHOD AND DEVICE FOR DETECTING AND LOCATING ORES IN AN ELECTRO-MAGNETIC WAY.

Application filed February 5, 1925, Serial No. 7,113, and in Sweden October 18, 1923.

This invention relates to the detecting and locating of ore bodies. More particularly, it relates to an electromagnetic device for determining the changes produced by an ore body upon an electromagnetic field generated in the territory or area to be prospected, and a method of locating ore bodies by the use of such a device.

Various devices have hitherto been employed for locating ore bodies electromagnetically by detecting the direction and magnitude of disturbances produced upon an electromagnetic field by a body of ore. Ordinarily, such devices comprise means for generating an electromagnetic field of calculated strength and means for detecting the effects caused by a body of ore upon this field. Such a detecting or pick-up circuit is operated at various points throughout the area to be investigated, and the results obtained at the several points are plotted to indicate the location of the ore body.

Present devices employ a pick-up circuit which determines the magnitude and direction of the disturbances directly in absolute units. That is, the value of the generated field and the magnitude and direction of the disturbances at the various points at which the pick-up circuit is operated are determined by noting their effect upon a galvanometer and from the deflections obtaining the absolute value of the electromagnetic disturbances.

The underlying principles of an electromagnetic system for locating ores may be briefly described as follows. At any given point in the area to be investigated, an alternating electromagnetic field is set up in a wire circuit usually placed upon the ground. The field thus produced is generally termed the primary field. In any ore bodies lying within the influence of this field currents will be induced, which in turn will set up a field of their own, a secondary field. The field actually existing in the area is then a combination of the primary and secondary fields and it is this resultant field which forms the basis for the operation of any detecting means which may be used.

The detecting means usually comprises a device possessing inductive properties, as a solenoid or the like, and amplifying and detecting instruments. The solenoid when placed at various points in the region of the resultant field produces feeble reactions which, when amplified, can be readily noted on a detecting instrument, such as a galvanometer. At each point at which the pick-up device is operated, the effect of the resultant field upon the solenoid is indicated directly. That is, greater deflections will be produced by the galvanometer when the device is in a region of greater field strength.

It is thus evident that if the frequency and intensity of the generated field has varied in value during the time that measurements have been made at different points throughout the area, the final results will not accurately determine the position of the ore body. It is therefore essential, with present detecting systems, that the frequency and intensity of the generated field be held constant, since the pick-up systems are all of the direct reading or absolute type.

To overcome such difficulties, since experience has shown that it is extremely difficult to maintain a generated field at substantially constant value, I have constructed a device and developed a method whereby the indications of the pick-up apparatus may be made independent of any variation in the generated field. In other words, I have invented a pick-up system and a method which determines the location of an ore body by comparative readings instead of by direct readings.

In general, my invention comprises the use of a primary field generating means and a pick-up system employing two loops or solenoids and suitable amplifying and detecting instruments. Since the indications of the pick-up system will not be direct reading indications I am enabled to use a sound detecting device such as a telephone receiver instead of a galvanometer. The sound reproduced in the receiver when the loops are operated provides the necessary indication for determining the point at which a proper setting is obtained.

Thus, I may generate a primary field of known strength and direction at any desirable point in the area to be investigated. Very close to the wire circuit of the primary field I may arrange one of the loops of my pick-up system. At another point, arranged at some distance from the wire circuit I may set up the other loop of my pick-up system. Since the first loop is located so close to the origin of the primary field that no appreciable influence will be evident from the secondary field, the first loop may be brought to a balance and a reading of resultant field strength obtained which reading will be substantially the same as that calculated for the primary field.

The second loop may then be brought to a balance to indicate the strength and direction of the resultant field at that point, and then the two loops may be balanced against each other. Since the value of the primary field is known and since the two loops are identical, or, if not so, their conversion constant can readily be calculated, the value of the resultant field at the point at which the second loop is located can readily be determined in terms of the primary field strength as a unit.

After the value of the field in terms of the primary field has been determined for the position of the second loop, the first loop may be moved to that point and the second loop moved to a new point. The same balancing operations may then be repeated and the value of the field at the new point determined in terms of the primary field as before. Since the value of the field at any point is thus calculated in terms of the primary field as a unit—as 1.5 units, 2.6 units, etc.—it follows that any variation in the strength and frequency of the primary field will not produce an error in the point to point determinations, inasmuch as the primary field is used only as a unit and while the value of the unit may change, the ratio will not. That is, if the value of the primary field is reduced, the value of the resultant field is also reduced, but it will always remain as so many units or fractions of units of the primary field. The point to point determinations may thus be carried out from place to place throughout the area and the exact location of the ore body determined.

Figure 2:
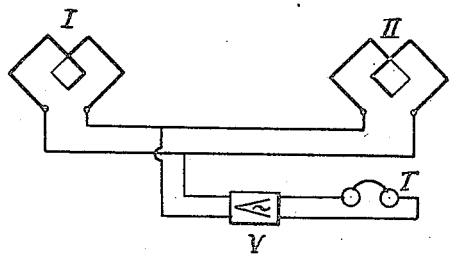
Figure 3:
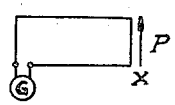

The invention can best be understood by referring to the accompanying drawings in which I have illustrated one embodiment of the invention. In the drawings:

Fig. 1 is a diagram of one form of wire circuit for generating the primary field, Fig. 2 is a circuit diagram of one form of pick-up system in accordance with the present invention, Fig. 3 is a diagrammatic illustration of the manner in which the pick-up system is used at various points to determine the location of the bed of ore.

Figure 11:
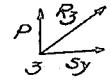
Figure 11:
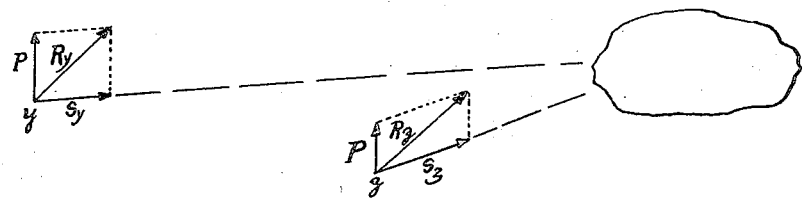
Figure 4:
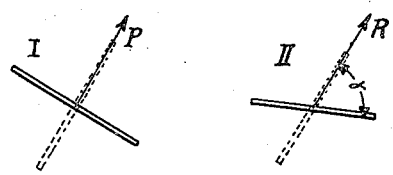
Figure 5:
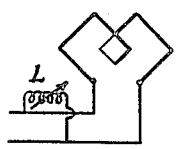
Figure 6:
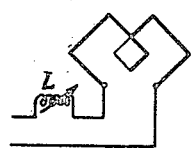
Figure 9:
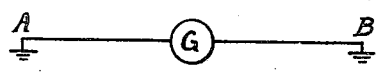
Figure 8:
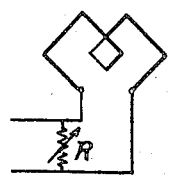
Figure 7:
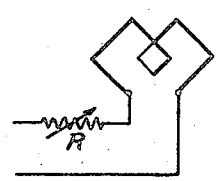
Figure 10:
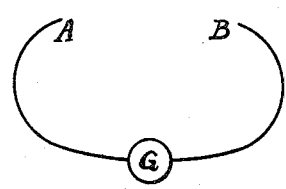
Figure 12:

Fig. 4 is a diagrammatic representation of the manner in which the two loops of one form of the pick-up system are balanced against each other, Fig. 5 is a circuit diagram showing a variable inductance in parallel with one of the loops, Fig. 6 is a circuit diagram showing a variable inductance in series with one of the loops, Fig. 7 is a circuit diagram showing a variable resistance in series with one of the loops, Fig. 8 is a circuit diagram showing a variable resistance in parallel with one of the loops, Fig. 9 is a diagram of a modified form of wire circuit for generating the primary field, Fig. 10 is a diagram of another form of wire circuit for generating the primary field, Fig. 11 is a vertical elevation of the electromagnetic field of an ore body showing the direction of the field at the points $x$, $y$ and $z$, Fig. 12 is a perspective view of a form of loop, in accordance with the invention.

Considering the drawings more in detail, the primary field may be produced by laying an insulated cable on the ground in the form of a rectangle, as shown at ABCDE Fig. 1, and connecting the ends of the cable AB to the terminals of an alternating current generator G. The field thus generated will penetrate into the surrounding area in the manner already described.

The primary field may also be generated by a galvanic circuit shown in Fig. 9. In this instance, the ends of the wire AB are thoroughly grounded and a generator inserted between the two ends. Still another manner of generating the field is shown in Fig. 10. The wire circuit is arranged in the form of an open loop having the two insulated arms AB connected by the generator. The field may thus be generated capacitively instead of inductively or galvanically as illustrated in Figs. 1 and 9. Regardless of which type of wire circuit is employed in generating the field, the lines of force will penetrate to any ore body in the vicinity and will set up secondary currents producing a secondary field modifying the primary field and forming a basis for the comparative determinations made with a pick-up circuit.

One form of the pick-up circuit which I use in making the comparative determinations is shown in Fig. 2. Two rotatable loops or coils of wire I and II connected in opposition to each other, have inserted in their common connecting leads, an amplifier V and a detecting instrument such as a telephone receiver T. When either of the loops is placed in the sphere of influence of an electromagnetic field and slowly turned, the maximum sound will be heard in the receiver when the coils of the loop cut the greatest number of lines of force, that is, when the plane of the loop is perpendicular to the lines of force or direction of the field, and no sound will be heard when the plane of the loop is parallel to the direction of the field.

If a given area is to be investigated in order to determine the location of certain ore bodies believed to be present, the primary field generating circuit is laid out and one of the loops of the pick-up circuit arranged very close to the cable forming part of the circuit. The other loop is temporarily disconnected. The first loop is then slowly turned until no sound is heard in the receiver. The plane of the loop is then parallel to the direction of the field. The loop is then turned perpendicular to the field and disconnected. Since the strength of the field is known at that point from the calculated strength of the primary field and since the direction has just been determined, both quantities are known for that particular location.

The second loop is then connected in circuit at any desired distant point and slowly turned to determine the direction of the field at that point. The first loop is then reconnected and the second loop turned until the sound in the receiver disappears. The angle between the plane of the second loop in its new position and its previous plane position is the angle which indicates the compensation which is necessary between the two loops when located at those two points at which the determinations were made.

Fig. 4 illustrates the action which has just been described. The direction of the field at the point of the first loop is represented by the arrow P and the direction of the field at the point of the second loop is represented by the arrow R. The angle through which the second loop is turned to provide compensation is indicated by $\alpha$.

After the two loops have been properly balanced and the magnitude of the angle $\alpha$ determined, the results are tabulated. The first loop is then moved to the position formerly occupied by the second loop and the second loop is moved to a new point and the operation repeated. After each balancing, the first loop is moved to the position of the second loop and the second loop moved to a new position until enough points have been spotted about the area to accurately determine the location of the ore body.

The manner in which the strength and direction of the primary field, as determined by the first loop in its initial position, and the various succeeding angles $\alpha$ are employed to determine the location of the ore body may be described with reference to Fig. 3.

The strength and direction of the primary field at an initial point, such as $x$, is plotted as a vector P of suitable length, since both quantities are known. The value of the angle $\alpha$, obtained by the second loop when located at any point such as $y$ while the first loop was at the point $x$, is then substituted in the equation $P = Rk \sin \alpha.$ Wherein P=strength of the primary field.
$k$=conversion contant for the two loops, which is 1 if the two loops have the same number of turns or coils of wire.

And R=strength of the resultant field at the point at which the second loop is located.

Since P is known and $\alpha$ and $k$ are known, the value of R can be readily calculated in terms of P as a unit. This value of R is then plotted as the vector $R_y$ at the point $y$ and given the direction which was determined as the direction of the field at that point by the loop II, as previously explained. The value of the primary field is then plotted at $y$ as the vector P of calculated length and direction as at $x$ and the vector $S_y$ determined by analysis. The direction which the vector $S_y$ assumes will be the direction of the secondary field at the point $y$, and by measuring the length of the vector the strength of the secondary field can be calculated in terms of P as a unit, regardless of the actual value of P at the time the determination was made.

When the first loop is moved to the point $y$ and the second loop to some point such as $z$ and the direction of the resultant field and angle $\alpha$ again determined, the results are plotted for that point and the strength and direction of the secondary field obtained as before. The value of P in the equation will be the value of the previous $R_y$ and the value of R will be the value of $R_z$. By repetition of the above procedure the results for all of the succeeding points may be plotted in the same manner. The prolongation of all the secondary field vectors plotted at the various points will determine the location of the ore bed, which point will be the point at which the vectors all converge. The primary field generating circuit may then be moved to a new point and the calculations repeated. Since all of the constants of the generating wire circuit are known the value of P can be readily calculated for any points such as $y$ and $z$ of Fig. 3. For level surfaces, the direction of the primary field will always be perpendicular to the surface of the ground.

The axis about which the loop is rotatable is perpendicular to the direction of the field to be determined. Sometimes only a component of the total resultant field is investigated, in which case the loops are turned about an axis perpendicular to this component. If the horizontal component is to be determined they are rotated about their vertical axis, and about their horizontal axis if the vertical component is investigated. As shown in Fig. 12 the frame of the loop is so mounted as to be capable of rotation about either the horizontal axis 1 or the vertical axis 2. The wooden frame 3 of the loop, forming the inner coil of insulated wire 4, being so mounted on the axis 1 as to make this rotation possible.

Instead of turning the loop II to bring about a balance and thereafter noting the angle α, a variable inductance or variable resistance may be connected in the circuit of the second loop, as indicated in Figs. 5, 6, 7 and 8. When the inductance or resistance is used, the loops are left in the position shown in Fig. 4 by the full line of loop I and the dotted line of loop II, which is the position of maximum sound, and the inductance or resistance varied until the sound disappears. By noting the value of the inductance or resistance left in circuit, to produce the balance, the ratio between the two field strengths can be readily determined by substitution of the value of the inductance or resistance in a suitable equation. The operation is then repeated for the different points and the results plotted as before.

The formula employed, when an impedance is used for balancing the loops, corresponds to the formula previously mentioned and may be stated as an equation.

$$P = Rlmp.$$

Wherein $l$ = the conversion constant for the two loops.

$m$ = value of impedance in minimum position.

$p$ = correction factor, which can be determined by investigating a field of known strength.

The manner in which the inductance or resistance is inserted in the loop circuit may vary for different conditions. Thus, the inductance may be connected in parallel as shown in Fig. 5 or in series as shown in Fig. 6, or the resistance may be connected in either series or parallel as shown in Figs. 7 and 8. In all cases where either the inductance or resistance is used, the balancing is effected by varying the value of these quantities instead of by varying the position of the loop.

Usually, it will be found that the resultant field will be in phase with the primary field. Should, however, conditions arise wherein the two fields are out of phase to any appreciable extent, the in-phase component of R is used in the calculations by means of the equation $$P = Rk \sin \alpha \cos \phi$$

where $\phi$ is the phase angle, the other values being already explained. The ratio determined by the two loops will then be the ratio between the primary field and the in-phase component $R \cos \phi$ of the resultant field. The value of the secondary field then determined by vector analysis will be the value of that part of the secondary field which is in phase with the primary field.

The use of a variable inductance or resistance in the circuit of one of the loops is particularly advantageous for such out of phase conditions as have been mentioned because by a proper manipulation of the value of the inductance or resistance the phase difference can be compensated and a more accurate determination of the silent point of the receiver can be made. As a result, more accurate readings will be obtained and the location of the ore body determined with greater exactness.

I claim:

1. A device for determining the ratio of two simultaneously observed strengths of a resultant field produced in the territory of a generated terrestrial alternating electromagnetic field by ore bodies located within the influence of the generated field, comprising two rotatable loops connected to each other and adapted to be placed at two different points of said field, an amplifier connected in the common circuit of said loops, and current detecting means connected to said amplifier.

2. A device for determining the ratio of two simultaneously observed strengths of a resultant field produced in the territory of a generated terrestrial alternating electromagnetic field by ore bodies located within the influence of the generated field, comprising two rotatable loops connected to each other and adapted to be placed at different points in said field, one of said loops being adapted to be rotated to compensate for the influence of said field upon the other of said loops, an amplifier connected in the common circuit of said loops, and an electromagnetic current detecting device connected to said amplifier.

3. A device for determining the ratio of two simultaneously observed strengths of a resultant field produced in the territory of a generated terrestrial alternating electromagnetic field by ore bodies located within the influence of the generated field, comprising two loops connected to each other and adapted to be placed at two different points in said field, means for varying the influence of said field upon the circuit of one of said loops to compensate for the influence of said field upon the other of said loops, an amplifier connected in the common circuit of said loops, and current detecting means connected to said amplifier.

4. A device for determining the ratio of two simultaneously observed strengths of the components of a resultant field produced in the territory of a generated terrestrial alternating electromagnetic field by ore bodies located within the influence of the generated field, comprising two loops connected to each other, an amplifier connected in the common circuit of said loops, and current detecting means connected to said amplifier.

5. In a method of electromagnetically detecting and locating ore bodies, the steps comprising generating a terrestrial alternating electromagnetic field, and determining the ratio of two simultaneously observed strengths of the resultant field produced at two different points by ore bodies located within the influence of said generated field.

6. In a method of electromagnetically detecting and locating ore bodies, the steps comprising generating a terrestrial alternating primary field to induce a secondary alternating electromagnetic field in ore bodies located within the influence of said primary field, determining the strength of the resultant of said primary and secondary fields at one point, and determining the strength of said resultant field at another point in terms of the resultant field strength at said first-mentioned point as a unit.

7. In a method of electromagnetically detecting and locating ore bodies, the steps comprising generating a terrestrial alternating primary field to induce a secondary alternating electromagnetic field in ore bodies located within the influence of said primary field, determining the strength and direction of said primary field at a point adjacent to the point of generation of said primary field, and simultaneously determining the strength of the resultant of said primary and secondary fields at a distant point in terms of the strength of the primary field at said first point as a unit.

8. In a method of electromagnetically detecting and locating ore bodies, the steps comprising generating a terrestrial alternating electromagnetic field, and determining the ratio of two simultaneously observed strengths of the components of the resultant field produced by ore bodies located within the influence of said generated field.

9. A method of electromagnetically detecting and locating ore bodies, which comprises generating a terrestrial alternating primary field to induce a secondary alternating electromagnetic field in ore bodies located within the influence of said primary field, determining the strength and direction of said primary field at a point adjacent to the point of generation of said primary field, and determining the strength of the resultant of said primary and secondary fields at any number of distant points in terms of the strength of the primary field as a unit.

10. A method of electromagnetically detecting and locating ore bodies, which comprises generating a terrestrial alternating primary field to induce a secondary alternating electromagnetic field in ore bodies located within the influence of said primary field, placing one of two loops at one point in the field, determining the direction of the resultant of the primary and secondary fields at that point, placing the other of the two loops at another point in the field, determining the direction of the resultant field at that point, connecting the two loops to each other, balancing said second loop against said first loop, determining the strength of the resultant field at said second point in terms of the resultant field at the first-named point as a unit, moving the first loop to the second-named point and the second loop to a new point, determining the strength of the resultant field at the new point in the same manner as before, and repeating the point-to-point movement for as many different points in the field as may be desired.

11. In a method of electromagnetically detecting and locating ore bodies, the steps comprising generating a terrestrial alternating electromagnetic primary field of known strength to induce a secondary alternating electromagnetic field in ore bodies located within the influence of said primary field, placing one of two loops at a point adjacent to the point of generation of said primary field, determining the direction of the primary field at that point, placing the other of the two loops at a distant point in the field, determining the direction of the resultant of the primary and secondary fields at that point, connecting the two loops to each other, balancing said second loop against said first loop, and determining the strength of the resultant field at the second-named point in the terms of the known primary field strength as a unit.

12. In a method of electromagnetically detecting and locating ore bodies, the steps comprising generating a terrestrial alternating electromagnetic primary field of known strength to induce a secondary alternating electromagnetic field in ore bodies located within the influence of said primary field, placing one of two rotatable loops at a point adjacent to the point of generation of said primary field, said loop circuit including an audible detecting device, rotating said loop until no sound is heard in the audible detecting device, thereby determining the direction of the primary field at that point, placing the other of the two loops at a distant point in the field, rotating said second loop until no sound is heard in the audible detecting device, thereby determining the direction of the resultant field at that point, rotating said first loop ninety degrees, thereby producing maximum sound in the audible detecting device, connecting the two loops to each other, balancing the second loop against the first loop by rotating the second loop until the sound disappears, measuring the angle between the plane of the second loop and the plane of the previously determined direction of the resultant field at that point, and from the value of said angle, the strength of said primary field and the direction of said resultant field determining the strength of the resultant field at said second point in terms of the strength of the primary field as a unit.

13. A method of electromagnetically detecting and locating ore bodies, which comprises generating a terrestrial alternating electromagnetic primary field of known strength to induce a secondary alternating electromagnetic field in ore bodies located within the influence of said primary field, placing one of two rotatable loops at a point adjacent to the point of generation of said primary field, said loop circuit including an audible detecting device, rotating said loop until no sound is heard in the audible detecting device, thereby determining the direction of the primary field at that point, placing the other of the two loops at a distant point in the field, rotating said second loop until no sound is heard in the audible detecting device, thereby determining the direction of the resultant field at that point, rotating said first loop ninety degrees, thereby producing maximum sound in the audible detecting device, connecting the two loops to each other, balancing the second loop against the first loop by rotating the second loop until the sound disappears, measuring the angle between the plane of the second loop and the plane of the previously determined direction of the resultant field at that point, and from the value of said angle, the strength of said primary field and the direction of said resultant field determining the strength of the resultant field at said second point in terms of the strength of the primary field as a unit, moving the first loop to said second-named point, moving the second loop to a new point, determining the strength of the resultant field at the new point in terms of the strength of the primary field as a unit in the same manner as the first determination, and repeating the point-to-point movement and determinations for as many different points in the field as may be desired.

14. In a method of electromagnetically detecting and locating ore bodies, the steps comprising generating a terrestrial alternating primary field to induce a secondary alternating electromagnetic field in ore bodies located within the influence of said primary field, placing one of two loops at a point adjacent to the point of generation of said primary field, determining the direction of the resultant of the primary and secondary fields at that point, placing the other loop at another point in the field, determining the direction of the resultant field at that point, balancing said second loop against said first loop, and determining the strength of the resultant field at said second point in terms of the strength of the resultant field at the first-named point as a unit.

15. In a method of electromagnetically detecting and locating ore bodies, the steps comprising generating a terrestrial alternating electromagnetic primary field of known strength to induce a secondary alternating electromagnetic field in ore bodies located within the influence of said primary field, placing one of two rotatable loops at a point adjacent to the point of generation of said primary field, said loop circuit including an audible detecting device common to both loops, rotating said first-mentioned loop until no sound is heard in the audible detecting device, thereby determining the direction of the primary field at that point, placing the other of the two loops at a distant point in the field, rotating said second loop until no sound is heard in the audible detecting device, thereby determining the direction of the resultant field at that point, rotating said first loop ninety degrees, thereby producing maximum sound in the audible detecting device, connecting the two loops to each other, balancing said second loop against said first loop, and determining the strength of the resultant field at said second point in terms of the strength of the primary field as a unit.

In testimony whereof I have signed my name to this specification.

KARL SUNDBERG.